United States Patent
Tawri et al.

(10) Patent No.: US 8,438,347 B1
(45) Date of Patent: May 7, 2013

(54) TECHNIQUES FOR PROACTIVE SYNCHRONIZATION OF BACKUPS ON REPLICATION TARGETS

(75) Inventors: Deepak Tawri, Sunnyvale, CA (US); Subrahmanyam Josyula, Cupertino, CA (US); Sasidharan Krishnan, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 995 days.

(21) Appl. No.: 12/056,871

(22) Filed: Mar. 27, 2008

(51) Int. Cl.
*G06F 12/00* (2006.01)

(52) U.S. Cl.
USPC .................... 711/162; 711/114; 711/E12.001

(58) Field of Classification Search .................. 711/162, 711/165, 161, E12.001, 112, 114
See application file for complete search history.

(56) References Cited

U.S. PATENT DOCUMENTS

| | | | | |
|---|---|---|---|---|
| 6,366,986 B1 * | 4/2002 | St. Pierre et al. | ............. | 711/162 |
| 6,779,093 B1 * | 8/2004 | Gupta | ............................ | 711/162 |
| 7,039,661 B1 * | 5/2006 | Ranade | ......................... | 707/610 |
| 7,246,258 B2 * | 7/2007 | Chen et al. | ..................... | 714/6.3 |
| 7,373,468 B1 * | 5/2008 | Gupta | ........................... | 711/162 |
| 2003/0046035 A1 * | 3/2003 | Anaya et al. | .................. | 702/188 |
| 2005/0273654 A1 * | 12/2005 | Chen et al. | ...................... | 714/13 |
| 2006/0277590 A1 * | 12/2006 | Limont et al. | .................... | 726/1 |

OTHER PUBLICATIONS

EMC Corporation; "Powerful remote replication solutions improve organizational productivity, enhance online business continuity"; available at: http://www.emc.com/collateral/software/data-sheet/1523-emc-srdf.pdf; 10 pages; 2008.
EMC Corporation; "Using EMC RecoverPoint Concurrent Local and Remote for Operational and Disaster Recovery"; available at: http://www.emc.com/collateral/software/white-papers/h4175-recoverpoint-concurrent-local-remote-oper-disaster-recovery-wp.pdf; 25 pages; Feb. 2008.

\* cited by examiner

*Primary Examiner* — Pierre-Michel Bataille
(74) *Attorney, Agent, or Firm* — Wilmer Cutler Pickering Hale and Dorr LLP

(57) ABSTRACT

Techniques for proactive synchronization of backups on replication targets are disclosed. In one particular exemplary embodiment, the techniques may be realized as a method for proactive synchronization of a backup on a replication target comprising reading a stored replication request to obtain replication data address information, sending the replication data address information to a replication target, receiving the replication data address information at the replication target, and copying data associated with the received replication data address information to a backup.

16 Claims, 3 Drawing Sheets

US 8,438,347 B1

TECHNIQUES FOR PROACTIVE SYNCHRONIZATION OF BACKUPS ON REPLICATION TARGETS

FIELD OF THE DISCLOSURE

The present disclosure relates generally to synchronization of backups and, more particularly, to techniques for proactive synchronization of backups on replication targets.

BACKGROUND OF THE DISCLOSURE

Many computing environments may use replication as a strategy to ensure high availability, fault tolerance and other objectives. Frequently these computing environments will use one or more backup strategies to backup data replicated to a secondary node from a primary node. Backups may require a significant amount of resources and time. In an effort to minimize the amount of resources which may be required, some computing environments may utilize snapshots of secondary node data. Computing environments utilizing asynchronous replication write requests of data on a secondary node may significantly lag behind replication write requests on a primary node. This may be due to the difference in input/output (I/O) speed between an application, file system or other process writing data at a primary node and the speed of the network bandwidth between the primary node and the secondary node. Snapshots, copy on write (COW) processes or other backups may require synchronization of the backup storage and the storage to be backed up and/or copying of some or all of the data on a secondary node to other storage, such as a snapshot volume, prior to allowing replication writes to the secondary node to resume. This may further delay replication write requests from a primary node to a secondary node. The delays in replication writes may expose a computing environment using asynchronous replication and snapshots or other backup methods to an increased loss of data should a primary node fail. The delays in replication writes may also affect a primary node replication rate and primary node performance. The delays in replication writes may be more significant in space optimized snapshots wherein a secondary node may need to write to backup storage one or more storage blocks which may be changed due to a replication write request, prior to writing the replication data.

In view of the foregoing, it may be understood that there may be significant problems and shortcomings associated with current backup technologies utilized on replication targets.

SUMMARY OF THE DISCLOSURE

Techniques for proactive synchronization of backups on replication targets are disclosed. In one particular exemplary embodiment, the techniques may be realized as a method for proactive synchronization of a backup on a replication target comprising reading a stored replication request to obtain replication data address information, sending the replication data address information to a replication target, receiving the replication data address information at the replication target, and copying data associated with the received replication data address information to backup storage.

In accordance with other aspects of this particular exemplary embodiment, the techniques may be realized as an article of manufacture for proactive synchronization of a backup on a replication target, the article of manufacture comprising at least one processor readable medium, and instructions carried on the at least one medium. The instructions may be configured to be readable from the at least one medium by at least one processor and thereby cause the at least one processor to operate so as to read a stored replication request to obtain replication data address information, send the replication data address information to a replication target, receive the replication data address information at the replication target, and copy data associated with the received replication data address information to a backup storage.

In accordance with further aspects of this particular exemplary embodiment, the techniques may be realized as a system for proactive synchronization of a backup on a replication target comprising one or more processors communicatively coupled to a server, wherein the server is configured to read a stored replication request to obtain replication data address information, send the replication data address information to a replication target, receive the replication data address information at the replication target, and copy data associated with the received replication data address information to a backup storage.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
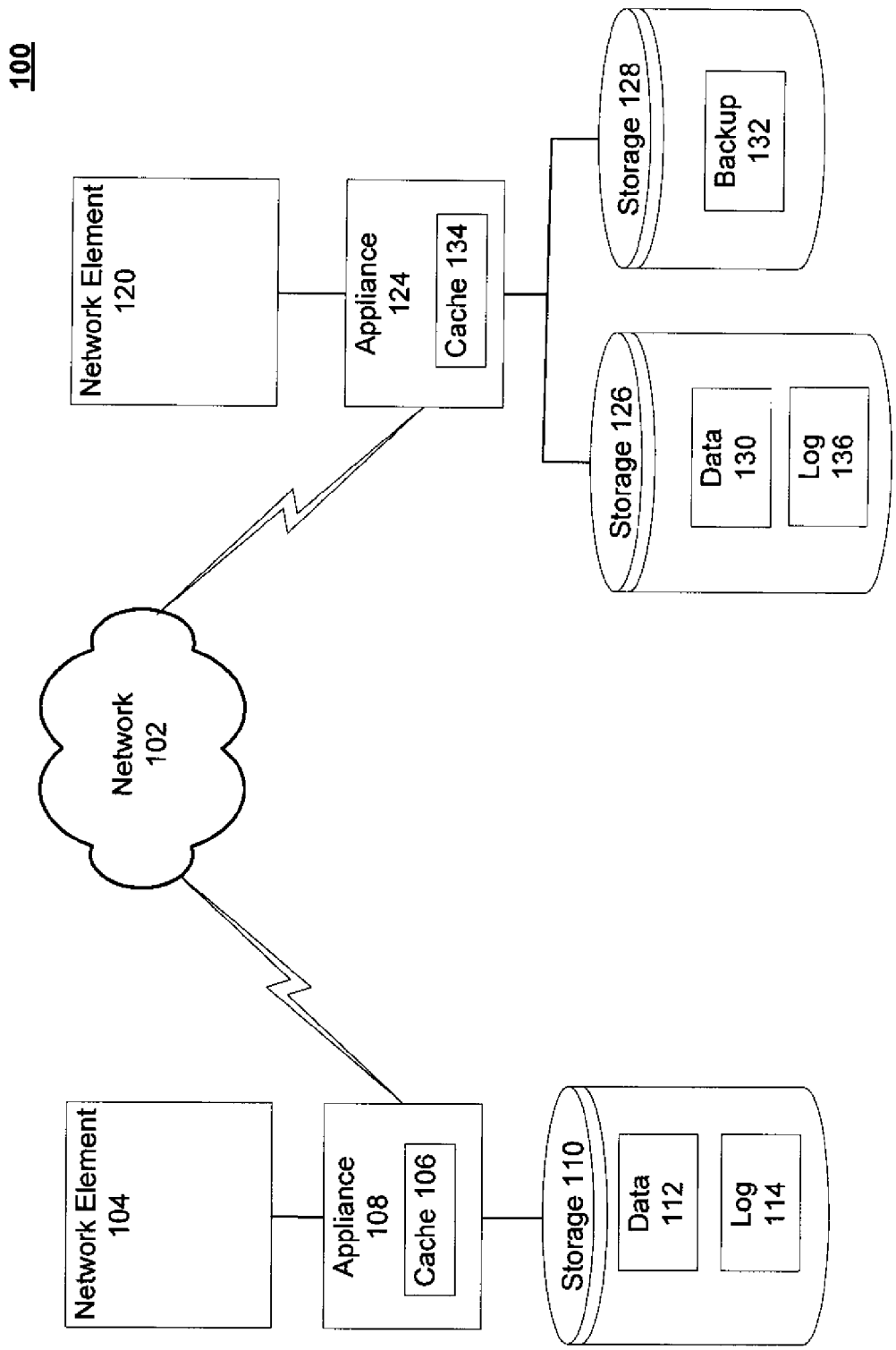
FIG. 1 shows a system for proactive synchronization of a backup on a replication target in accordance with an exemplary embodiment of the present disclosure.

Referring to FIG. 1, there is shown a system 100 for proactive synchronization of a backup on a replication target in accordance with an embodiment of the present disclosure. FIG. 1 is a simplified view of system 100, which may include additional elements that are not depicted. Network elements 104 and 120 may be communicatively coupled to network 102 via appliances 108 and 124. Appliance 108 may enable access to storage 110. Appliance 108 may contain cache 106. Storage 110 may contain data 112 and log 114. Appliance 124 may enable access to storage 126 and storage 128. Appliance 124 may contain cache 134. Storage 126 may contain data 130 and log 136. Storage 128 may contain backup 132.

Network 102 may be a local area network (LAN), a wide area network (WAN), the Internet, a cellular network, a satellite network, or another network that permits communication between network elements 104 and 120, appliances 108 and 124, and other devices communicatively coupled to network 102.

Network elements 104 and 120 may be application servers, backup servers, network storage devices or other devices communicatively coupled to network 102. Network elements 104 and 120 may utilize storage 110, 126, and 128 for the storage of application data, backup data or other data.

Data 112 may be application data or other data associated with network element 104, which may be a primary node. Data 112 may be replicated via appliances 108 and 124 across network 102. Data 130 may be a replicated copy of data 112. Data 130 may be associated with network element 120, which may be a secondary node.

Appliances 108 and 124 may be continuous data protection and replication (CDP/R) devices which may provide continuous data protection and replication (CDP/R) services to network elements 104 and 120. CDP/R services may be provided through the use of a network switch or may be provided through a continuous data protection and replication (CDP/R) device and/or appliance. In one or more embodiments, appliances 108 and 124 may represent a network switch, such as a fibre channel switch providing CDP/R services to network elements 104 and 120. Appliances 108 and 124 may be communicatively coupled to storage 110, 126 and 128. Appliances 108 and 124 may contain cache 106 and cache 134, respectively.

Cache 106 and 134 may be a cache for storing synchronous or asynchronous replication write requests. Cache 106 may be cache for storing replication write requests which may represent changes written to data 112 by one or more processes running on network element 104. Cache 106 may store one or more replication write requests until the one or more replication write requests are able to be transmitted to a secondary node, such as network element 120. Cache 106 may have a fixed size and when replication write requests exceed that size, replication write requests may be written to a log, such as log 114. Replication write requests may be kept in order and written, transmitted, and handled in order. Writes directed to data 112 may therefore be processed, written to storage at a primary node, replicated, and written to storage at a secondary node in the order they are generated. Cache 134 may represent cache associated with an appliance at a secondary node which may be used to store replication write requests received from a primary node until the replication write requests can be written to disk. Cache 134 may be a fixed size. Once the fixed size is reached, stored replication write requests may be written to a log, such as log 136, until they may be written to data 130.

Storage 110, 126, and 128 may be local, remote, or a combination thereof to network elements 104 and 120. Storage 110, 126, and 128 may utilize a redundant array of inexpensive disks (RAID), a redundant array of inexpensive nodes (RAIN), tape, disk, or other computer accessible storage. In one or more embodiments storage 110, 126, and 128 may be a storage area network (SAN), an internet small computer systems interface (iSCSI) SAN, a Fibre Channel SAN, a common Internet File System (CIFS), network attached storage (NAS), or a network file system (NFS).

Storage 128 may be storage utilized for backup of storage 126. For example, storage 128 may contain a snapshot volume, such as backup 132, which may be a backup of data 130.

Backup 132 may be a full snapshot, an instant snapshot, a space optimized snapshot, a storage mirror, a backup from a copy on write process, or other backup of data 130. Backup 132 may be created by a copy on write (COW) process. The copy on write process may write blocks or other storage units from data 130 to backup 132 prior to overwriting those blocks in data 130 with data received from a replication write request.

In some embodiments, network element 104 may be a primary node replicating asynchronously with network element 120, which may be a secondary node and/or a replication target. One or more applications or other processes utilizing network element 104 may write to storage 110 and may have a higher rate of input/output (I/O) than the rate of replication to a secondary node, such as network element 120. The difference in this input/output rate may increase when the handling of replication write requests received at a secondary node is delayed further. The handling of replication write requests may be delayed at a secondary node if data can not be written to storage associated with the secondary node until one or more writes to snapshot or other backup are completed. For example, backup 132 may be a snapshot of data 130, such as a space optimized snapshot. A replication write request may be received by appliance 124 indicating that blocks A and B (not shown) are to be changed to A' and B' (not shown) in data 130. Backup 132 may require blocks A and B from data 130 to be written to backup 132 before they can be overwritten on data 130 with blocks A' and B'. If a process managing a space optimized snapshot, such as backup 132, is given information ahead of the replication write request regarding which blocks are to be changed, these blocks may be copied to the snapshot prior to receiving the replication write request. A primary node, such as network element 104, may send replication data address information to a secondary node which may be managing a snapshot, prior to sending a replication write request. The secondary node may receive such replication data address information and may copy the corresponding data to the snapshot prior to receiving the replication write request. When the replication write request is received by a secondary node, it may be written directly to storage and may not be delayed by a snapshot data copy such as a copy on write process (COW). The replication data address information may be significantly smaller than the replication write request data it refers to and may require less bandwidth to send. The replication data address information may be sent for multiple queued replication write requests in a replication write request cache or log, such as cache 106 and/or log 114. Replication data address information may be an address in memory or storage of the blocks to be changed and may be represented as an offset and a length or by other identifiers sufficient to enable a backup process to identify one or more blocks to be copied. A replication process, such as an appliance on a primary node, may send replication data address information via a control message as part of the replication process or a data message as part of the replication process. Replication data address information may be sent in the order it is to be processed so that a snapshot may first copy the one or more blocks for which it will first receive replication write requests. For example, replication data address information may be sent using a first in first out (FIFO) algorithm which may represent an order of replication write requests stored in log 114 and/or cache 106. A control message, such as an in band control (IBC) message, may signal that a primary node is sending replication data address information to a secondary node. A primary node may begin reading log 114 to first send replication data address information for the oldest replication write requests, and may continue sending replication data address information by reading through the log 114. The replication data address information may be received by a secondary node as a signal indicating which blocks on data 130 have impending changes which are to be replicated. The secondary node may freeze one or more data volumes, such as data 130, so data may not be written to data 130 until the secondary node is consistent with the primary node. Freezing the secondary node may ensure that data to be backed up is in a consistent state and that there are no uncompleted transactions. Once the secondary node is consistent with the primary node, the secondary node, network element 120, may unfreeze data 130. The backup 132 may continue a copy on write or other backup process after the unfreezing of data 130. Network element 104 may send replication data information until data 130 is synchronized. When network element 104, the primary node, detects that data 130 is synchronized, it may stop sending replication data address information. The secondary node, network element 120, may send a control message to the primary node to indicate that synchronization is complete. The secondary node may use an in band control message, an out of band control message or another messaging mechanism to indicate to the primary node that synchronization is complete. Other algorithms and methods of determining when to send replication data address information may be used. For example, a primary node may use one or more algorithms to determine how many addresses to send which may be based on a size of replication log, a flow control sending rate of replication data on a primary node, a size of a replication cache, a speed of a copy on write process on a secondary node, and/or other input/output rate or data size indicators. In some embodiments, a backup may be a space optimized snapshot which may backup only data which is to be changed. In one or more embodiments embodiments, a full snapshot may be optimized by enabling a backup to copy blocks for which there are pending write requests. Although a full snapshot may copy all blocks, the process copying blocks may copy the blocks sequentially or by another algorithm by default. This process may be provided with replication data address information regarding blocks to copy first for which there are pending replication write requests. These blocks may be given priority so that replication may proceed with storage that is currently being backed up. In some embodiments, a separate process may receive replication data address information and may handle backing up the corresponding blocks. This separate process may then provide information to a primary backup process indicating which blocks have been backed up. The primary backup process may then skip the backup of the blocks backed up by a separate process. Other backup mechanisms and/or storage redundancy mechanisms may be optimized by using proactive synchronization. For example, the preparation and synchronization of storage to create a storage mirror may be optimized utilizing proactive synchronization.

Figure 2:
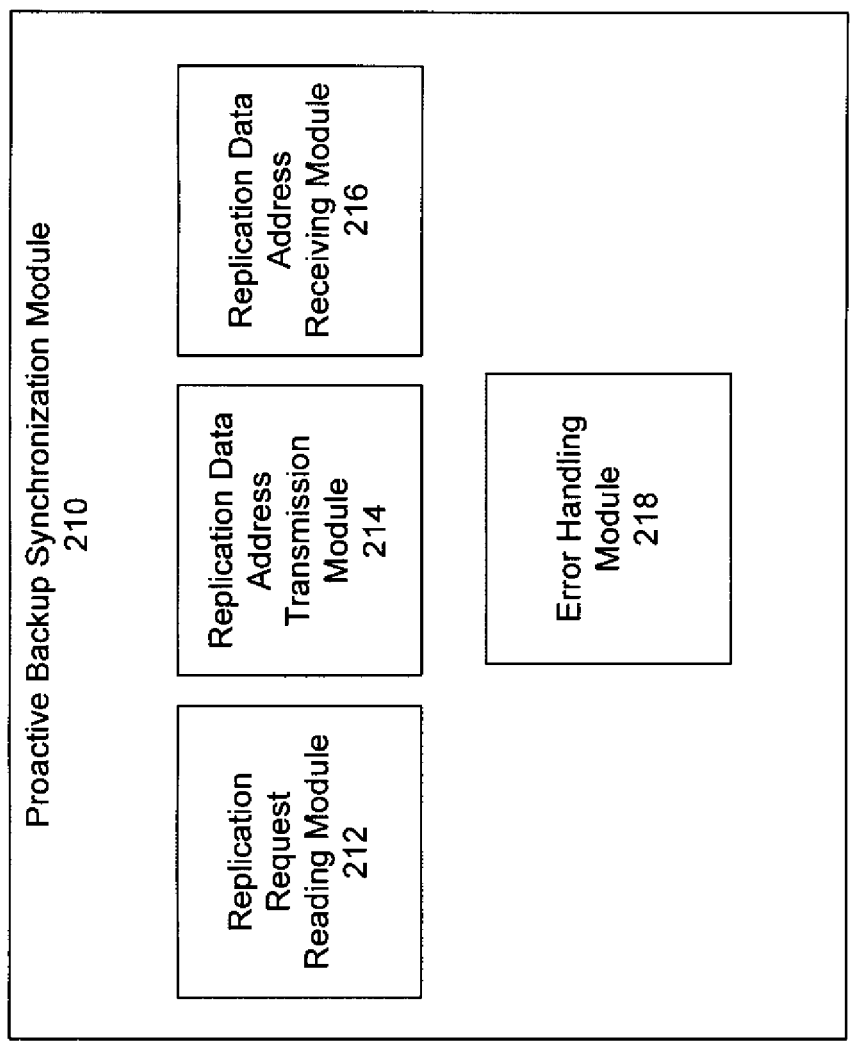
FIG. 2 shows a module for managing proactive synchronization of a backup on a replication target in accordance with an exemplary embodiment of the present disclosure.

Referring to FIG. 2, there is shown a module 210 for proactive synchronization of a backup on a replication target in accordance with an exemplary embodiment of the present disclosure. As illustrated, FIG. 2 depicts a proactive backup synchronization module 210. Proactive backup synchronization module 210 may contain one or more components including replication request reading module 212, replication data address transmission module 214, replication data address receiving module 216, and error handling module 218.

Replication request reading module 212 may monitor and/or read one or more replication requests. Replication request reading module 212 may read a stored replication write request from a log of a primary node, a cache of a primary node, a log of a secondary node, and/or a cache of a secondary node. Replication request reading module 212 may read one or more replication write requests in response to one or more signals or triggers. Replication request reading module 212 may obtain replication data address information, such as an offset and a length identifying a block to be changed by a replication write request in a log. Replication request reading module 212 may send replication data address information to replication data address transmission module 214.

Replication data address transmission module 214 may utilize control messages, such as an in band control (IBC) message, to send replication data address information to a secondary node. Replication data address transmission module 214 may also utilize data messages or other messages to transmit replication data address information to a secondary node. Replication data address transmission module 214 may send replication data address information in the order it is received. In one or more embodiments, the order in which replication data address information is sent may be determined at least in part by factors, such as the proximity of a block to be copied to the address of another block to be copied. In one or more embodiments, the order in which replication data address information is sent may be based at least in part on an algorithm to reduce seeks, scans or other data reading and/or writing delays.

Replication data address receiving module 216 may receive replication data address information and may provide such information to a process managing a backup on a secondary node. For example, replication data address receiving module 216 may provide replication data address information to a copy on write process (COW) which may be maintaining a space optimized snapshot. Replication data address receiving module 216 may also provide information to enable the proactive synchronization of a full snapshot, other backups or a storage mirror.

Error handling module 218 may be a module which may be able to facilitate flow control of replication data address information. Error handling module 218 may handle resending replication data address information, halting the transmission of replication data address information, or taking other corrective actions in the event of an error.

Figure 3:
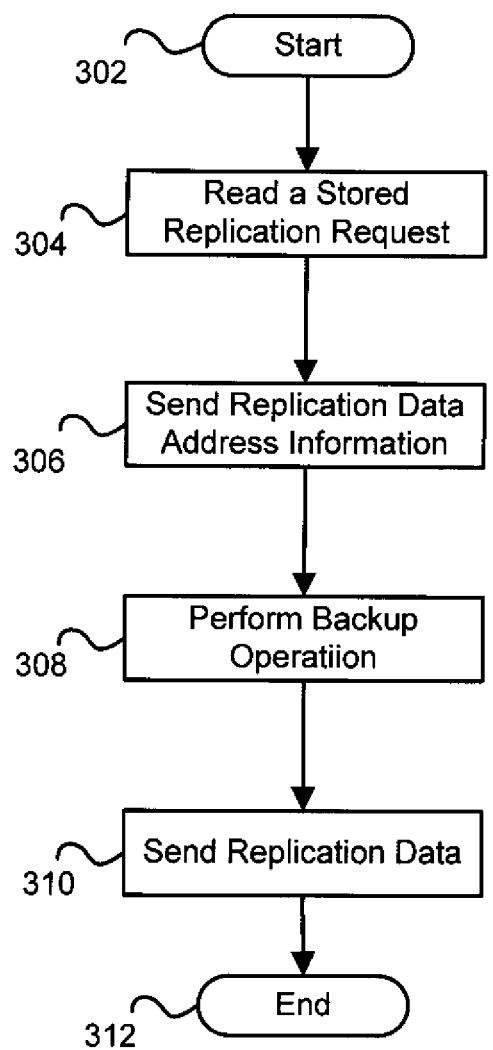
FIG. 3 shows a method proactive synchronization of a backup on a replication target in accordance with an exemplary embodiment of the present disclosure.

Referring to FIG. 3, there is shown a method 300 for proactive synchronization of a backup on a replication target in accordance with an exemplary embodiment of the present disclosure. At block 302, method 300 may begin.

At block 304, a stored replication write request may be read from a log, cache or other storage. Replication write requests may be read in advance of sending the replication write request to a secondary node.

At block 306, replication data address information may be obtained and may be sent to a secondary node. Replication data address information may be an indicator for enabling a secondary node to identify one or more blocks for which there are impending replication changes. Replication data address information may be, for example, an offset and a length identifying an address in memory, on disk, or in other storage of a block to be changed. Replication data address information may be sent as part of a normal replication message, such as a control message or a data message.

At block 308, a replication data address information transmission may be received. A secondary node, a replication appliance, or another replication component may receive the replication data address information and may begin backing up the storage to which the replication data address information refers. The replication data address information may enable the data on a secondary node to be backed up prior to receiving the replication write request to overwrite one or more portions of the data on the secondary node.

At block 310, the replication write request may be sent by a primary node and may be received by a secondary node. The secondary node may have already backed up the data on the secondary node and may write the replication data to storage.

At block 312, method 300 may end.

At this point it should be noted that proactive synchronization of a snapshot on a replication target in accordance with the present disclosure as described above typically involves the processing of input data and the generation of output data to some extent. This input data processing and output data generation may be implemented in hardware or software. For example, specific electronic components may be employed in a replication appliance or similar or related circuitry for implementing the functions associated with proactive synchronization of snapshots in accordance with the present disclosure as described above. Alternatively, one or more processors operating in accordance with stored instructions may implement the functions associated with proactive synchronization of snapshots in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for proactive synchronization of a backup on a replication target comprising:
one or more processors communicatively coupled to a server; wherein the server is configured to:
read a stored replication request associated with a primary node to obtain replication data address information;
send the replication data address information to a secondary node utilizing a control message, wherein the control message signals that the primary node is sending the replication data address information to the secondary node, the secondary node freezes data storage based at least in part upon the control message, and wherein the primary node continues sending replication data address information until the secondary node sends a control message to the primary node;
receive the replication data address information at the secondary node; and
copy data associated with the received replication data address information from the secondary node to a backup storage.

2. The system of claim 1, wherein the replication data address information comprises a length and an offset of the data.

3. The system of claim 1, wherein the backup is one of a full snapshot, a space optimized snapshot, a backup from a copy on write process, and a storage mirror.

4. The system of claim 1, where the processor is further configured to utilize a data message to send replication data address information from a primary node to the secondary node.

5. The system of claim 1, wherein the control message is an in band control message.

6. The system of claim 1, wherein the stored replication request is read from at least one of a replication log and a replication cache.

7. An article of manufacture for proactive synchronization of a backup on a replication target, the article of manufacture comprising:
at least one non-transitory processor readable storage medium; and
instructions carried on the at least one medium;
wherein the instructions are configured to be readable from the at least one medium by at least one processor and thereby cause the at least one processor to operate so as to:
read a stored replication request associated with a primary node to obtain replication data address information;
send the replication data address information to a secondary node utilizing a control message, wherein the control message signals that the primary node is sending the replication data address information to the secondary node, the secondary node freezes data storage based at least in part upon the control message, and wherein the primary node continues sending replication data address information until the secondary node sends a control message to the primary node;
receive the replication data address information at the secondary node; and
copy data associated with the received replication data address information from the secondary node to a backup storage.

8. A method for proactive synchronization of a backup on a replication target comprising:
reading, using at least one computer processor, a stored replication request associated with a primary node to obtain replication data address information;
sending the replication data address information to a secondary node utilizing a control message, wherein the control message signals that the primary node is sending the replication data address information to the secondary node, the secondary node freezes data storage based at least in part upon the control message, and wherein the primary node continues sending replication data address information until the secondary node sends a control message to the primary node;
receiving the replication data address information at the secondary node; and
copying data associated with the received replication data address information from the secondary node to backup storage.

9. The method of claim 8 wherein the replication data address information comprises a length and an offset of the replication data.

10. The method of claim 8, wherein the backup is one of a full snapshot, a space optimized snapshot, a backup from a copy on write process, and a storage mirror.

11. The method of claim 8, further comprising utilizing a data message to send the replication data address information from a primary node to the secondary node.

12. The method of claim 8, wherein the control message is an in band control message.

13. The method of claim 8, wherein the stored replication request is read from at least one of a replication log and a replication cache.

14. The method of claim 8, wherein the stored replication request is read from a primary node.

15. The method of claim 8, wherein the stored replication request is read from a secondary node.

16. At least one non-transitory processor readable storage medium storing a computer program of instructions configured to be readable by at least one processor for instructing the at least one processor to execute a computer process for performing the method as recited in claim 8.

* * * * *